United States Patent
Teng et al.

(10) Patent No.: US 11,280,557 B2
(45) Date of Patent: Mar. 22, 2022

(54) STRATIFIER FOR TANK-TYPE WATER HEATER

(71) Applicant: A.O. SMITH CORPORATION, Milwaukee, WI (US)

(72) Inventors: Yingwu Teng, Charlotte, NC (US); Michael W. Schultz, Columbia, SC (US)

(73) Assignee: A. O. SMITH CORPORATION, Milwaukee, WI (US)

( * ) Notice: Subject to any disclaimer, the term of this patent is extended or adjusted under 35 U.S.C. 154(b) by 101 days.

(21) Appl. No.: 16/306,859

(22) PCT Filed: Mar. 21, 2017

(86) PCT No.: PCT/US2017/023448
§ 371 (c)(1),
(2) Date: Dec. 3, 2018

(87) PCT Pub. No.: WO2017/209832
PCT Pub. Date: Dec. 7, 2017

(65) Prior Publication Data
US 2019/0137189 A1 May 9, 2019

Related U.S. Application Data (60) Provisional application No. 62/345,548, filed on Jun. 3, 2016.

(51) Int. Cl.
*F22D 7/04* (2006.01)
*F28D 20/00* (2006.01)
(Continued)

(52) U.S. Cl.
CPC .......... *F28D 20/0039* (2013.01); *F24D 3/02* (2013.01); *F24D 11/02* (2013.01);
(Continued)

(58) Field of Classification Search
CPC .............. F28D 20/00; F28D 2020/006; F28D 2020/0065; F22D 7/00; F22D 7/04; F24H 9/124; F24H 9/122
See application file for complete search history.

(56) References Cited

U.S. PATENT DOCUMENTS 2,602,465 A * 7/1952 Goehring ............... B65D 88/54
137/582
2,766,200 A * 10/1956 Kaufman ................ F24H 9/124
204/196.15
(Continued)

FOREIGN PATENT DOCUMENTS

CN 2308044 Y 2/1999
DE 3819317 A1 12/1988
(Continued)

OTHER PUBLICATIONS

Garcia-Mar et al., "A new inlet device that enhances thermal stratification during charging in a hot water storage tank," Applied Thermal Engineering, 2013, 61:663-669.
(Continued)

*Primary Examiner* — Gregory A Wilson
(74) *Attorney, Agent, or Firm* — Michael Best & Friedrich LLP (57) ABSTRACT

A tank-type water heater includes a storage tank and a heating circuit outside of the tank. The heating circuit includes at least one heat engine and at least one pump for circulating water from the bottom of the tank through the heat engine and back to the top of the tank. A stratifier introduces the heated water from the heating circuit into the top of the tank in a diffuse manner to promote stratification of hot water in the tank.

19 Claims, 10 Drawing Sheets

(51) Int. Cl.
*F28F 9/02* (2006.01)
*F24D 12/02* (2006.01)
*F24D 3/02* (2006.01)
*F24D 11/02* (2006.01)

(52) U.S. Cl.
CPC .......... *F24D 11/0214* (2013.01); *F24D 12/02* (2013.01); *F28F 9/0273* (2013.01); *F28D 2020/0069* (2013.01); *Y02B 30/00* (2013.01); *Y02E 60/14* (2013.01)

(56) References Cited

U.S. PATENT DOCUMENTS

| | | | |
|---|---|---|---|
| 3,181,793 | A | 5/1965 | MacCracken et al. |
| 3,316,894 | A * | 5/1967 | Ramey ............... F24D 17/00 122/19.1 |
| 4,248,294 | A | 2/1981 | Budzynski et al. |
| 4,278,069 | A | 7/1981 | Clark, Jr. |
| 4,510,922 | A * | 4/1985 | Roussos ............... F24D 11/003 126/616 |
| 4,848,277 | A | 7/1989 | Bommer |
| 5,988,117 | A * | 11/1999 | Lannes ............... F24H 9/124 122/159 |
| 6,436,285 | B1 | 8/2002 | Kerfoot |
| 6,770,194 | B1 | 8/2004 | McGrath |
| 6,935,280 | B1 * | 8/2005 | Scott ............... F24H 9/0042 122/13.3 |
| 6,976,802 | B2 * | 12/2005 | Hall ............... A47L 13/22 401/138 |
| 7,392,766 | B2 | 7/2008 | Jackson |
| 7,634,976 | B2 | 12/2009 | Gordon et al. |
| 7,861,678 | B2 * | 1/2011 | McClellan ............... F22D 7/04 122/14.3 |
| 7,997,236 | B2 | 8/2011 | Pussell |
| 8,720,388 | B2 * | 5/2014 | Beyerle ............... F24D 19/1009 122/20 B |
| 10,288,316 | B1 * | 5/2019 | Currey ............... F24H 9/0047 |
| 10,429,084 | B2 * | 10/2019 | Yin ............... F24D 17/02 |
| 2008/0265046 | A1 | 10/2008 | Grimes |
| 2010/0326428 | A1 | 12/2010 | Engelhart |
| 2011/0094706 | A1 * | 4/2011 | Ramani ............... F28D 20/0039 165/10 |
| 2012/0125320 | A1 | 5/2012 | Engelhart |
| 2016/0003468 | A1 | 1/2016 | Malone et al. |

FOREIGN PATENT DOCUMENTS

| | | |
|---|---|---|
| DE | 29820047 U1 | 1/1999 |
| DE | 102009024304 A1 | 12/2010 |
| EP | 1936314 A2 | 6/2008 |
| FR | 2230953 A1 | 12/1974 |
| FR | 2304870 A1 | 10/1976 |
| GB | 606225 A | 8/1948 |
| GB | 906910 A | 9/1962 |
| GB | 2209821 A | 5/1989 |
| WO | 1996018072 A1 | 6/1996 |
| WO | 2013083911 A1 | 6/2013 |

OTHER PUBLICATIONS

International Search Report and Written Opinion for Application No. PCT/US2017/023448 dated Jun. 16, 2017 (12 pages).
International Preliminary Report on Patentability for Application No. PCT/US2017/023448 dated Dec. 13, 2018 (7 pages).
Extended European Search Report issued by the European Patent Office for Application No. 17807153.6 dated Jan. 2, 2020 (8 pages).
Examination Report issued by the Indian Patent Office for Application No. 201817045602 dated Aug. 27, 2020 (6 pages).
Office Action issued by the China National Intellectual Property Administration for Application No. 201780041076.0 dated Sep. 2, 2020 (15 pages including English translation).
Office Action issued by the China National Intellectual Property Administration for Application No. 201780041076.0 dated Jan. 22, 2021 (11 pages including English translation).
Office Action issued by the China National Intellectual Property Administration for Application No. 201780041076.0 dated Jun. 16, 2021 (10 pages including English translation).

* cited by examiner

STRATIFIER FOR TANK-TYPE WATER HEATER

CROSS-REFERENCE TO RELATED APPLICATION

This application claims the benefit of prior filed, U.S. Provisional Patent Application No. 62/345,548, filed Jun. 3, 2016, the entire contents of which are incorporated by reference herein.

BACKGROUND

A criterion of evaluating of a hot water storage tank is its volume usage efficiency, i.e. how much percentage of its total storage vessel capacity is filled with hot water at desired temperature. When a hot water storage tank is deployed, cold water drawn from its lower portion goes through a heat engine such as a boiler, a tankless water heater or another tank type water heater, and is heated to desired temperature prior to being charged into the hot water storage tank from its top portion. As the hot water storage tank is being charged, the temperature of water leaving the storage tank gets warmer and warmer due to mixing of charging hot water and existing water in the tank. In order to maintain the efficiency of heat engine and/or for some other considerations, the temperature of water that leaves the lower portion of the storage tank and goes into inlet of the heat engine could not be indefinitely high.

Temperature regulation is typically put in place to regulate the temperature of water leaving the lower portion of the storage tank. Typically the hot water from the heat engine would be discharged into the top portion of the storage tank through a traditional pipe nipple, which would lead to a normal mixing. With normal mixing, water is gradually stratified from top to bottom of the storage tank.

SUMMARY

Applicant has observed that, in a known hot water storage tank with external heat engine, the temperature of water in the top portion of a storage tank could be significantly lower than that of water leaving the heat engine and the temperature of water in the bottom portion could be very close to that of water in the top portion. Thus the storage tank in such systems may not be charged with water at desired temperature.

A new water stratifier is provided to minimize mixing in the storage tank of hot water returned from the heat engine. With minimum mixing, water is significantly stratified across a thin layer of water near the bottom of the storage tank. Above this thin layer of water, temperature of water is uniform and very close to that of water leaving the heat engine; below this thin layer of water, temperature of water is also uniform but much lower than that of water leaving the heat engine. Thus the majority of the storage tank is charged with water at desired temperature and the efficiency of the heat engine can be ensured by the low temperature of inlet water coming from lower portion of the storage tank. The new water stratifier will allow a high charging flow to shorten the charging duration. In addition, the new water stratifier would allow different sizes of storage tank.

In one construction, the invention provides a tank for storage of water, the tank including a top and a bottom; a heating circuit including a heat engine outside of the tank, a heating circuit outlet communicating between the bottom of the tank and the heat engine for delivery of water to be heated from the tank bottom to the heat engine, and a heating circuit return communicating between the heat engine and tank for return to the tank of water heated by the heat engine; and a stratifier introducing the heated water from the heating circuit return into the top of the tank in a diffuse manner to promote stratification of hot water in the tank above the heating circuit outlet.

In some constructions, fluid flow through the stratifier has a Reynolds number less than 500. In some constructions, the stratifier imparts laminar flow to the heated water being introduced to the top of the tank. In some constructions, the stratifier includes a plurality of holes for diffusion of the heated water into the top of the tank. In some constructions, the stratifier includes a longitudinal axis disposed vertically in the top of the tank. In some constructions, the stratifier includes a plurality of holes having axes perpendicular to the longitudinal axis, the holes causing laminar and diffuse flow of heated water into the top of the tank. In some constructions, the tank is cylindrical and includes a height and a diameter, the aspect ratio of tank height to diameter being less than 2.0 or less than 1.5 or less than 1.2.

In another construction, the invention provide a method of maximizing hot water stored in a water heater tank, the method comprising the steps of: providing a tank having a top and a bottom; filling the tank with water; drawing water from the bottom of the tank; heating the water drawn from the tank in an external heat engine; and returning the heated water from the external heat engine to the top of the tank in a manner that minimizes turbulence in the water in the tank.

In some aspects of the invention, step (a) includes providing a cylindrical tank having a height-to-diameter ratio of less than 2.0 or less than 1.5 or less than 1.2. In some aspects of the invention, step (e) includes introducing the heated water into the top of the tank at a Reynolds number below 500. In some aspects of the invention, step (e) includes introducing the heated water into the top of the tank as a laminar flow. In some aspects of the invention, step (e) includes passing the heated water through a stratifier to introduce the heated water into the top of the tank in a diffuse fashion to minimize mixing with water in the tank. In some aspects of the invention, step (e) includes positioning a vertical stratifier in the top of the tank, flowing the heated water through the stratifier, and introducing the water into the top of the tank with the stratifier in a diffuse, laminar fashion. In some aspects of the invention, the vertical stratifier includes a plurality of holes having horizontal axes such that heated water is introduced into the top of the tank horizontally through the holes. In some aspects of the invention, step (e) includes introducing the water into the top of the tank at a Reynolds number below 500.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
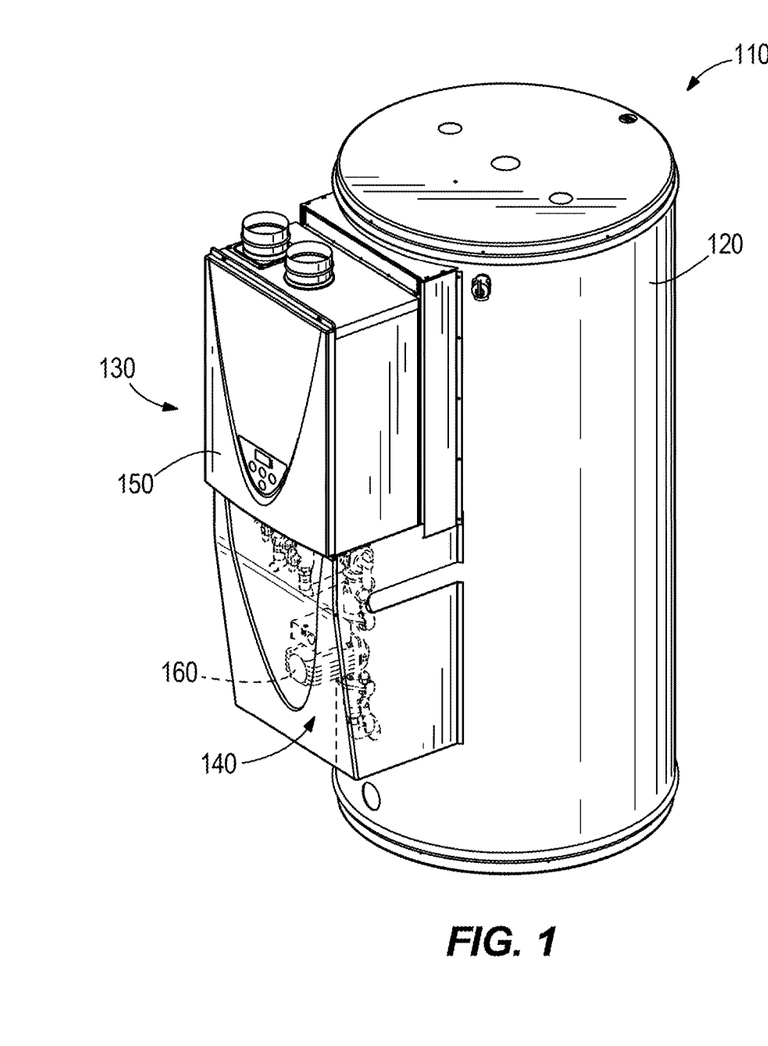
FIG. 1 illustrates a first construction of the invention including a relatively tall tank and a single heat engine.

FIG. 1 illustrates a water heater 110 according to a first construction of the present invention which includes a relatively tall water tank 120 and a heating circuit 130. The relatively tall water tank 120 may have a height of, for example, 77⅝" and a diameter of, for example, 28¼" and may be a 120 gallon water heater for example. The heating circuit 130 is external to the tank 120 and includes plumbing (which will be explained in more detail below) 140 and a heat engine 150. The heating circuit 130 draws cold water from the bottom of tank 120, heats the cold water in the heat engine 150 to produce hot water, and returns the heated water to the top of the tank 120. The heating circuit 130 in this illustrated construction includes a single pump 160 for moving the water through the circuit 130. The components such as the tank 120, the plumbing 140, heat engine 150, and pump 160 are used in the following constructions as well, and the same reference numbers are used unless a component or system is substantially different from what is already described.

Figure 2:
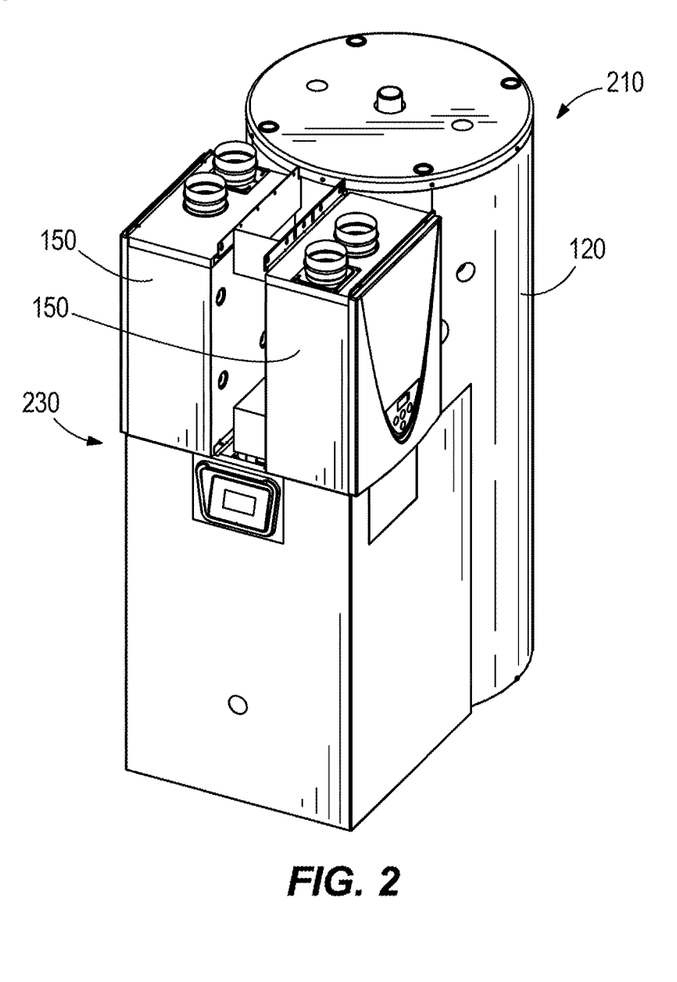
FIG. 2 illustrates a second construction of the invention including a relatively tall tank and a pair of heat engines.

FIG. 2 illustrates a water heater 210 according to a second construction of the present invention which includes a relatively tall water tank 120, and a heating circuit 230. The heating circuit 230 in this construction is different from what is illustrated in FIG. 1, but is substantially the same as that described with respect to FIGS. 3 and 5-8 below. For example, the heating circuit 230 includes a pair of heat engines 150 instead of a single heat engine 150 and also includes a pair of pumps 160 (shown in FIGS. 3 and 5-8) in addition to the pair of heat engines 150. Circulation is about 7 GPM for one pump and 10 gallons per minute (GPM) for two pumps 160 in series as illustrated.

Figure 3:
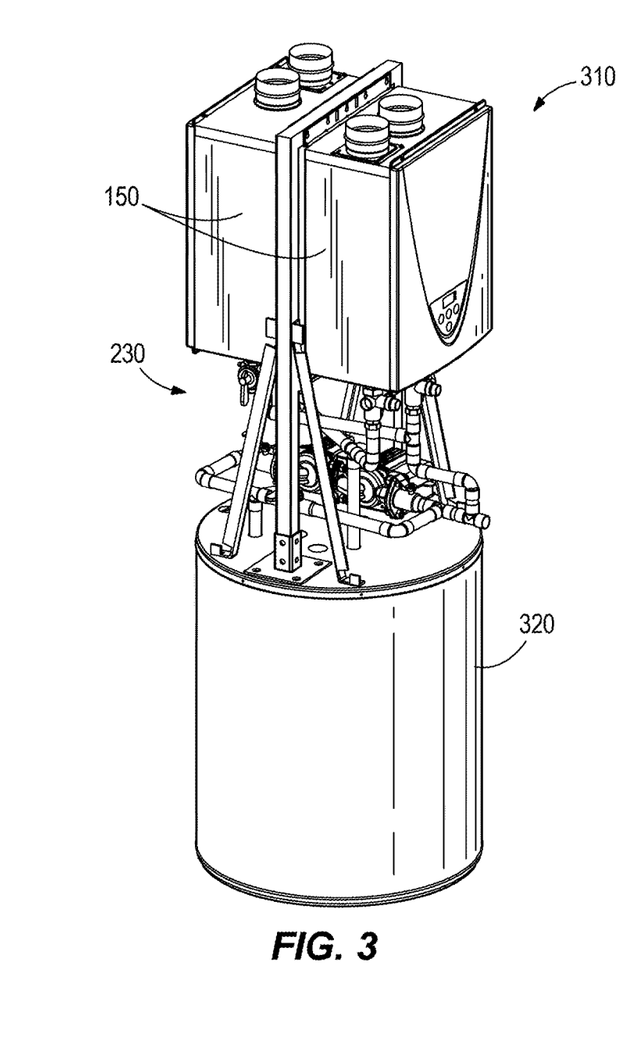
FIG. 3 illustrates a third construction of the invention including a relatively short tank and a pair of heat engines.

FIG. 3 illustrates a water heater 310 according to a third construction of the present invention which includes a relatively short water tank 320 and a heating circuit 230 substantially the same as that of FIG. 2. The form factor of this water heater configuration is within the envelope of space occupied by a commercial gas water heater such as the CYCLONE® water heater manufactured by A. O. Smith Corporation. The CYCLONE® water heater occupies a space of about 77⅝" (height)×28¼" (width)×28¼" (depth). In other words, this water heater 310, including the tank 320, and heating circuit 230 (including the heat engines 150) occupies the same space that could be occupied by a standard gas-fired water heater such as the CYCLONE® water heater and could directly replace such standard gas-fired water heaters without requiring additional space.

Figure 4:
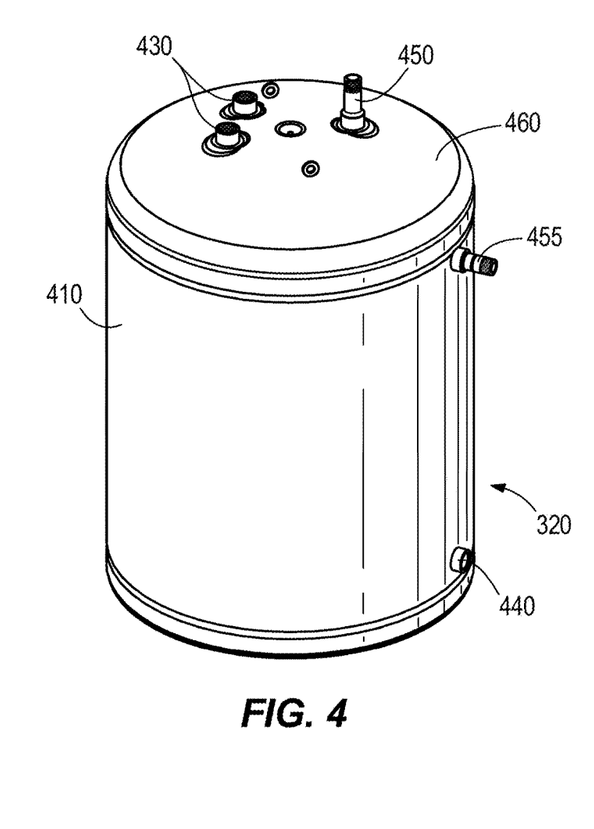
FIG. 4 illustrates the tank from the construction of FIG. 3.

FIG. 4 illustrates the relatively short tank 320 from the water heater of FIG. 3. The tank 320 is relatively short, with an exemplary height of 26.69" and tank diameter of about 22.5". The aspect ratio (H/D) is 1.19. In other constructions, the aspect ratio of the tank 320 can be less than 2.0 or less than 1.5 or less than 1.2. The tank 320 includes a shell 410, a cold water inlet 420, a hot water outlet 430, a cold water outlet 440, a hot water return 450, and a temperature and pressure relief spud 455. The relatively tall tanks 120 of the previous two constructions include the same features as the relatively short tank 320 of this construction, except that the tank shells for the taller tanks 120 are taller. The system flow rate (i.e., flow rate into the tank 320 through the cold water inlet 420 and flow out of the tank 320 through the hot water outlet 430) may be about 19 GPM, for example. The following discussion of operation of the invention applies to all illustrated water heater constructions 110, 210, 310.

The cold water inlet 420 is a conventional spud on the tank head 460, connecting to the cold water supply pipe of the building. A dip tube inside the tank 120, 320 and supported in the cold water inlet 420 delivers the cold water to the bottom of the tank 120, 320. The hot water outlet 430 is a conventional spud on the tank head, connecting to hot water pipes in the building for drawing hot water from the top of the tank 120, 320 and delivering it to a faucet, shower, appliance or other hot water consuming device.

The cold water outlet 440 is a spud communicating through the tank shell 410 with the bottom of the tank 320. Cold water is drawn from the bottom of the tank 120, 320 through the cold water outlet 440 and delivered via the heating circuit 130, 230 to the heat engine 150 (in FIG. 1) or engines 150 (FIGS. 2 and 3). The hot water return 450 is a spud in the top head 460 of the tank 320 which communicates with the heating circuit 130, 230 for the return of hot water from the heat engine(s) 150 to the top of the tank 120, 320. The pressure relief spud 455 accommodates a temperature and pressure relief valve that opens if pressure within the tank exceeds a threshold. The temperature and pressure relief spud 455 is positioned in the upper portion of the tank 120, 320.

Figure 5:
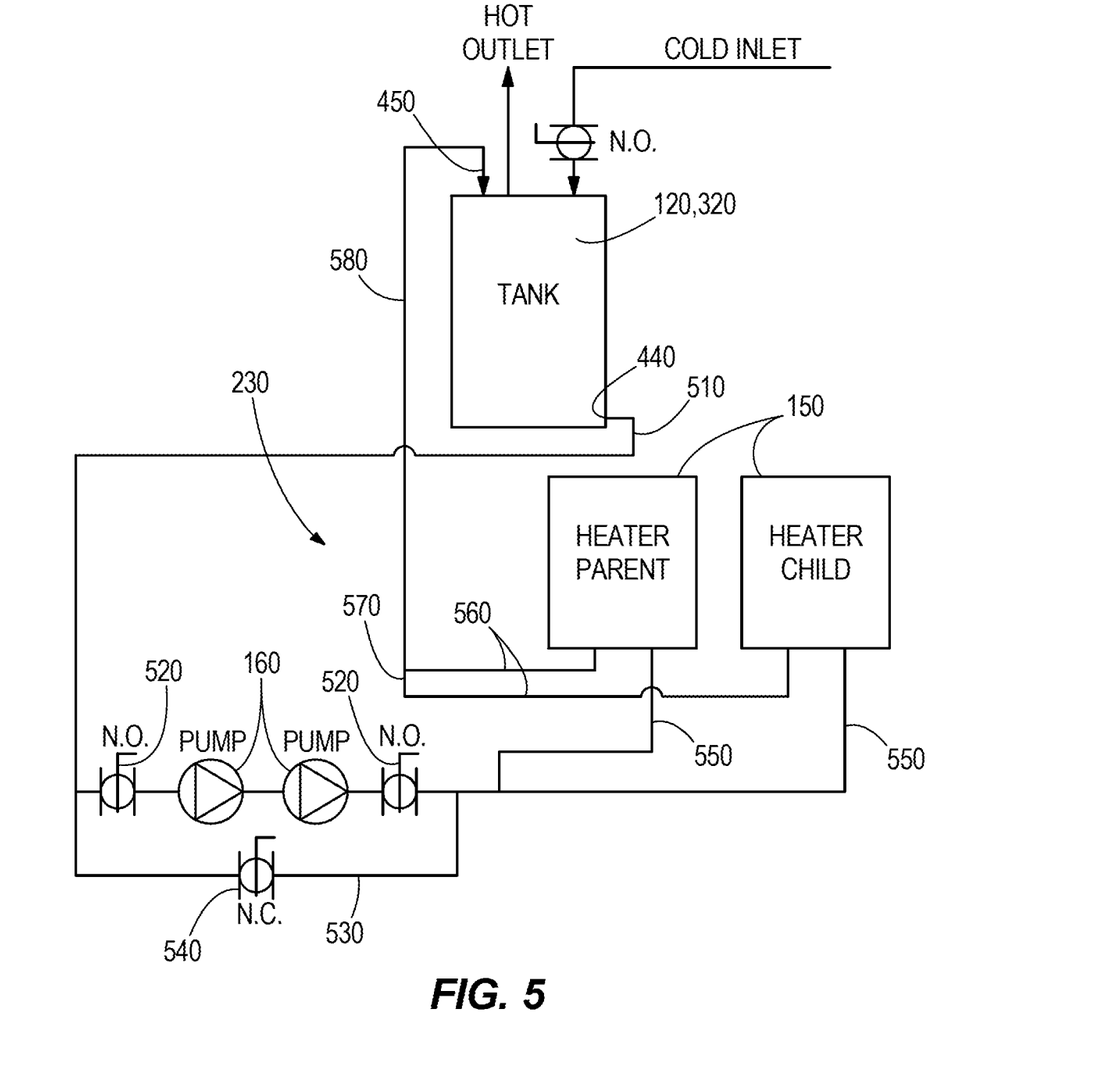
FIG. 5 is a schematic illustration of the plumbing of the construction of FIG. 3.
Figure 6:
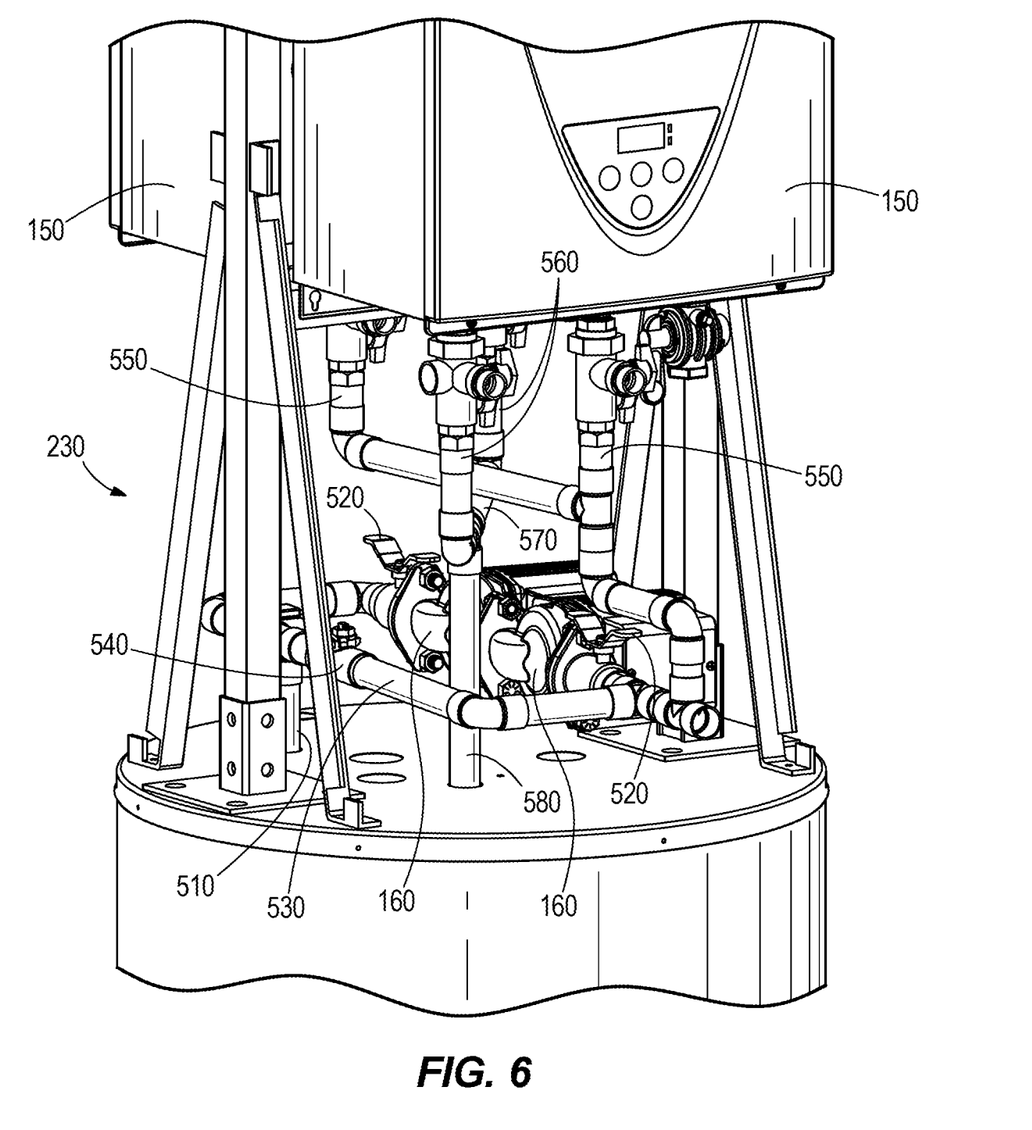
FIG. 6 is an enlarged view of the plumbing of the construction of FIG. 3.
Figure 7:
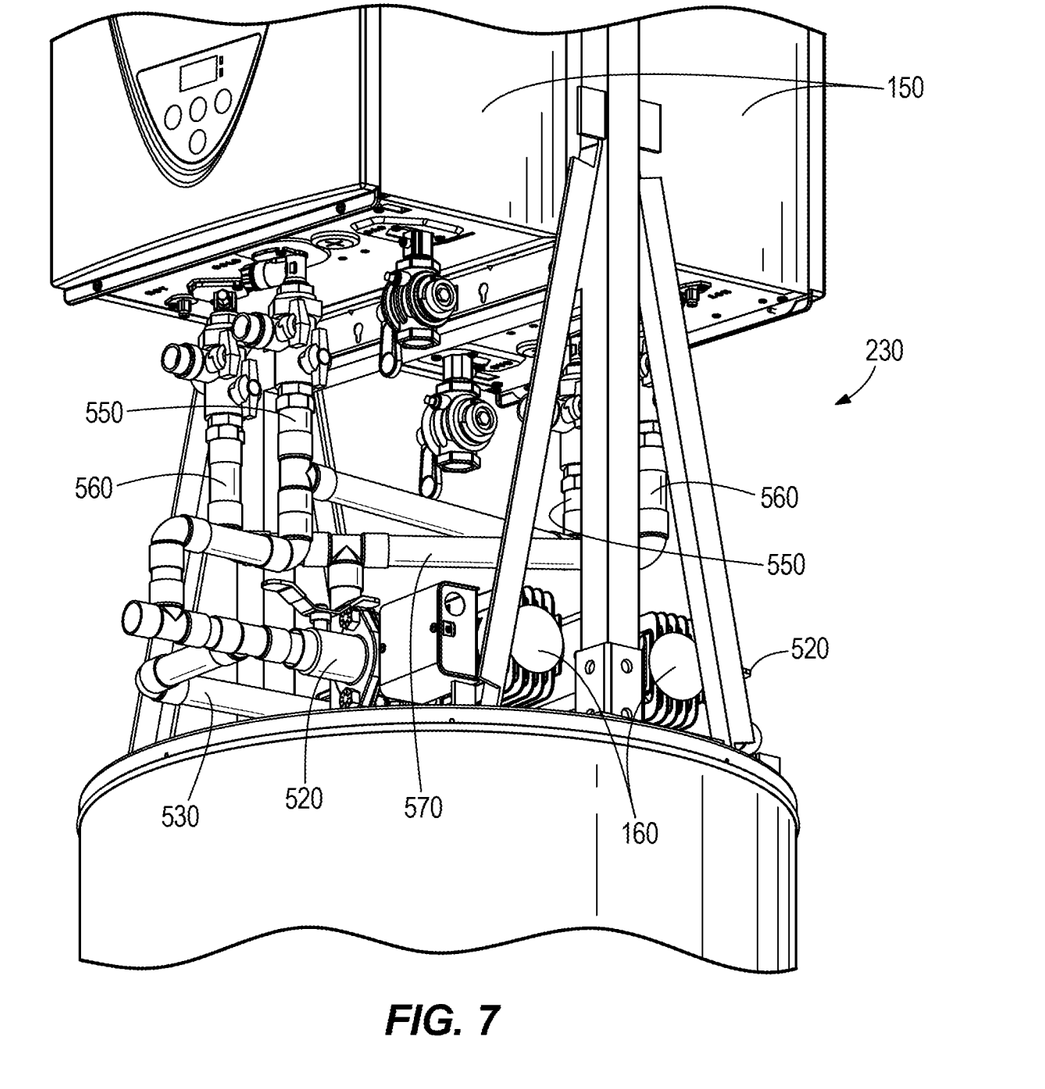
FIG. 7 is another view of the plumbing.
Figure 8:
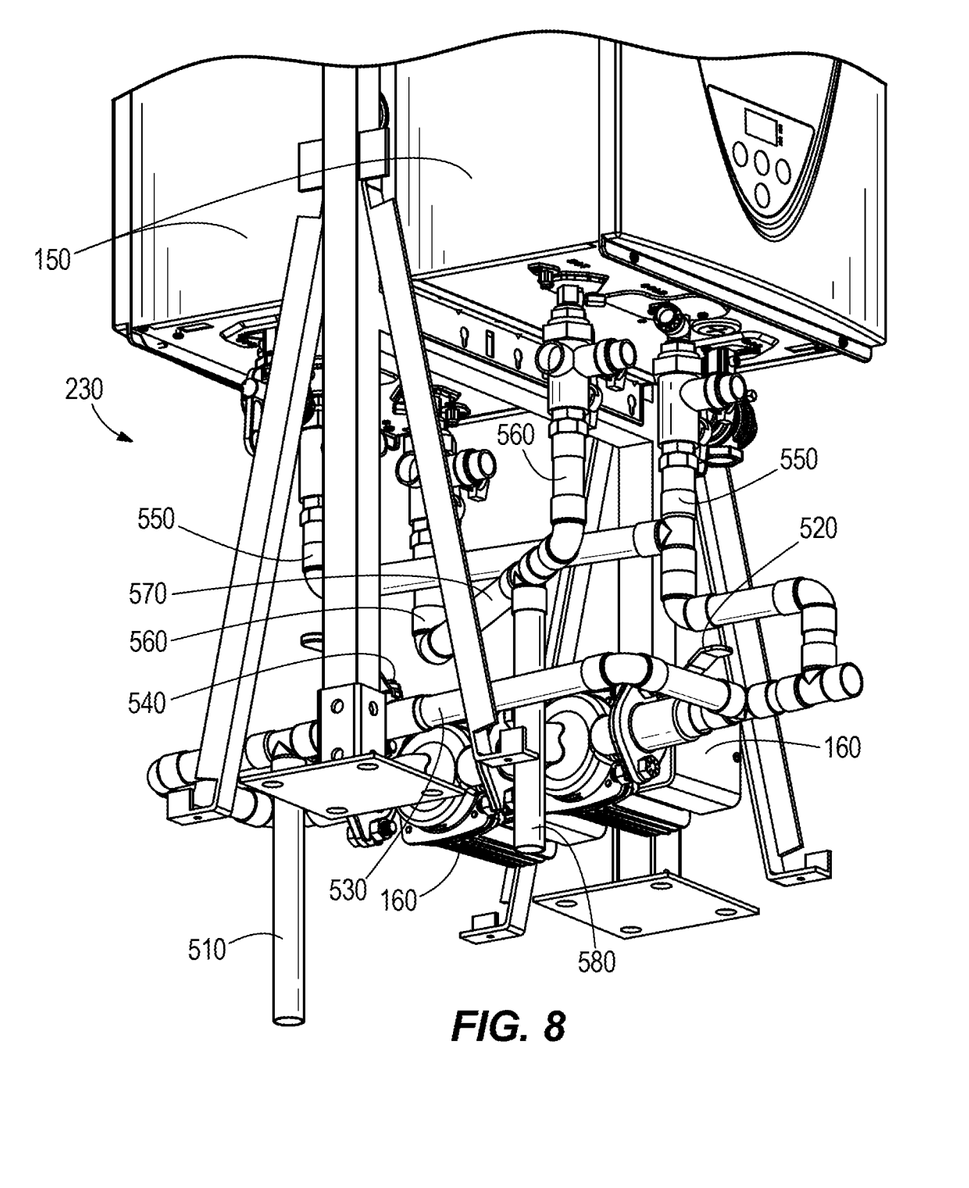
FIG. 8 is another view of the plumbing.

Turning now to FIG. 5, the heating circuit 230 of the second and third constructions (i.e., water heaters 210, 310 in FIGS. 2 and 3) is shown. The heating circuit 230 is also illustrated in FIGS. 6-8, where the same reference numbers are used for the same portions of the circuit 230.

The heating circuit 230 includes a cold water outlet line 510 that communicates between the cold water outlet 440 of the tank 120, 320 and a pair of pumps 160 arranged in series. In an alternative construction, the cold water outlet 440 could be positioned in anywhere as long as the cold water is drawn from the bottom of the tank. For example, the cold water outlet 440 can be combined with the cold water inlet 420 through a tee connection. Normally-open valves 520 are positioned upstream and downstream of the pair of pumps 160. A bypass conduit 530 with a normally-closed valve 540 bypasses the pair of pumps 160 in the event one or both of the pumps needs servicing. Interconnecting the pair of pumps 160 with the pair of heat engines 150 (which may individually be referred to as a first heat engine and a second heat engine) are parallel input lines 550 that deliver the cold water to the heat engines 150. Parallel output lines 560 interconnect the output sides of the heat engines 150 to a hot water return manifold 570 which mixes the hot water from the two heat engines 150.

A single hot water return line 580 conducts the hot water from the manifold 570 to the hot water return 450 of the tank 120, 320. Similar to cold water outlet 440, the hot water return 450 may be put in alternative locations as long as the hot water is entering into the top of the tank 120, 320. For example, the hot water return 450 can be combined with the hot water outlet 430 through a tee connection. One branch of the tee connection is fit into top end of the water stratifier assembly 610 (FIG. 9) and the water stratifier assembly 610 is threaded into the hot water return 450 spud of the tank. Another alternative is to utilize a side-mounted hot water return and connect the hot water return line 580 to the side-mounted hot water return. Such a side-mounted hot water return would look similar to the temperature and pressure relief spud 455 and would be at about the same height in the tank such that the water stratifier assembly 610 communicates with the upper portion of the tank 120, 320. This would introduce the hot water into the top of the tank 120, 320 horizontally through the sidewall of the tank shell.

The systems also include a pump control, UIM and isolation valves for each heat engine 150. The isolation valves can be used to repair or replace a heat engine 150 that is not working properly while continuing operation of the system with a single heat engine 150. The dual heat engine 150 system permits continuous operation of the system even if one of the heat engines 150 fails.

The heating circuit 130 of the first construction (FIG. 1), by contrast, includes a single pump 160, a single input line 550 to a single heat engine 150. The heating circuit 130 does not require the output lines 560 or manifold 570, but instead directly delivers hot water from the heat engine 150 to the hot water return 450 via the single hot water return line 580.

Cold water from the bottom of the tank 120, 320 flows through the heat engine 150 or engines 150, is heated as it flows through the heat engine(s) 150, and is returned to the tank 120, 320 as hot water. The heat engines 150 are gas-fired tankless water heaters in the illustrated embodiment, but could be substantially any heat engine (e.g., electric tankless water heater, steam heat exchanger) external to the tank 120, 320.

Figure 9:
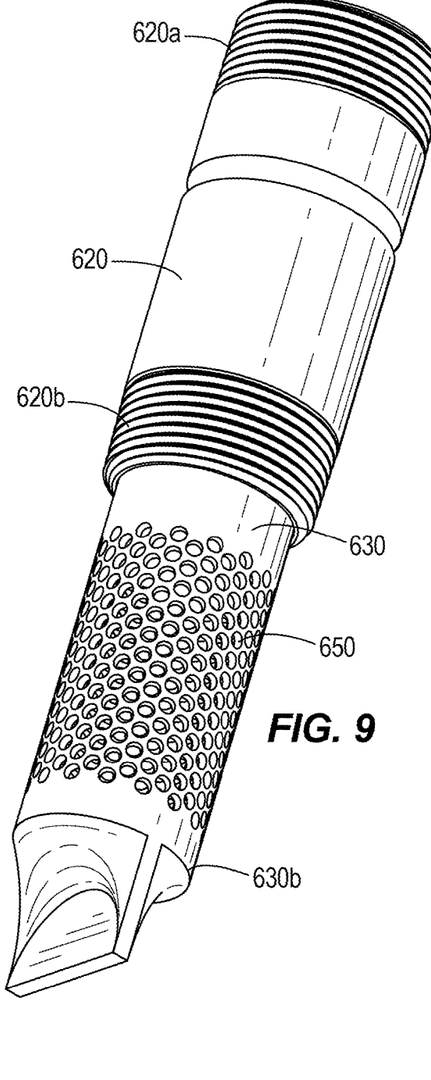
FIG. 9 illustrates the stratifier assembly of the invention.
Figure 10:
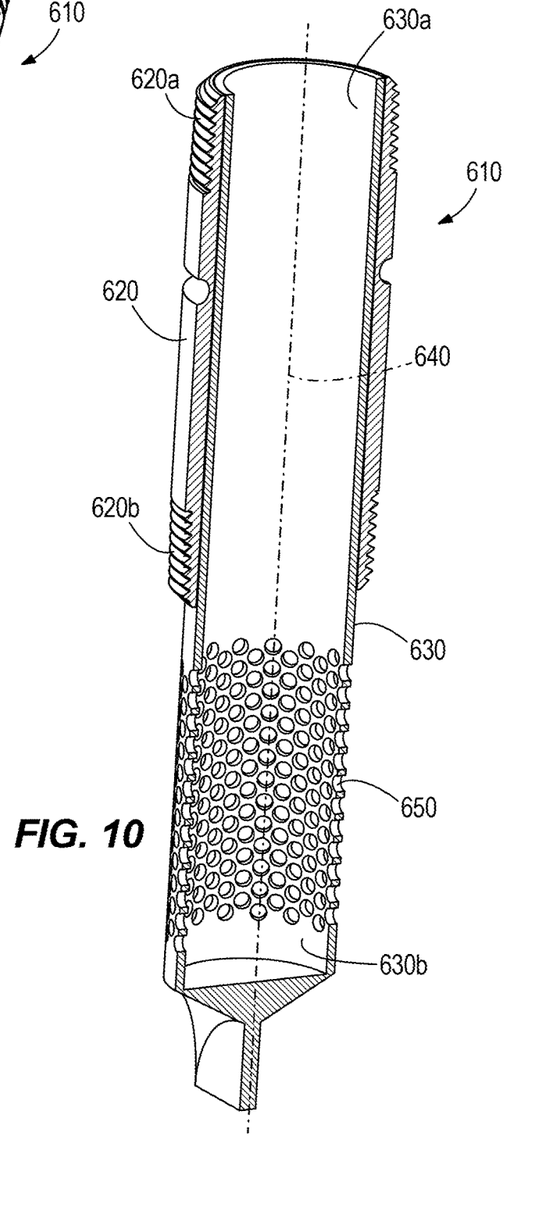
FIG. 10 is a cross-section view of the stratifier.

FIGS. 9 and 10 illustrate a stratifier assembly 610 which is received in the hot water return 450 of the tank 120, 320. In this regard, the stratifier assembly 610 receives hot water from the hot water return line 580 of the heating circuit 130, 230 and delivers the hot water into the top of the tank 120, 320. The stratifier assembly 610 includes a pipe nipple 620 and a stratifier 630 inside the pipe nipple 620. The stratifier assembly 610 includes a longitudinal axis 640 which is intended to be vertical in the illustrated constructions (i.e., installed through the tank top head), but in other constructions may be horizontal (i.e., installed through the tank shell). Terms such as upper, lower, top, bottom and other terms indicating orientation are used for convenience with respect to the illustrated construction, but should be understood to also describe the ends of the stratifier assembly 610 installed in a horizontal orientation (e.g., the upper or top end and the lower or bottom end becoming respective first and second ends or left and right ends when the stratifier assembly 610 is turned horizontally, on its side). For example, the stratifier assembly 610 could be installed through the side-mounted hot water return described above.

The pipe nipple 620 has top and bottom ends 620a, 620b. The top end 620a of the pipe nipple 620 is threaded into the hot water return line 580 of the heating circuit 130, 230 and the bottom end 620b of the pipe nipple 620 is threaded into the spud that forms the hot water return 450 on the tank 120, 320.

The stratifier 630 includes top and bottom ends 630a, 630b and upper and lower portions adjacent to the respective top and bottom ends 630a, 630b. The stratifier 630 may be constructed of plastic or metal. The upper portion of the stratifier 630 is within the pipe nipple 620. The upper portion is retained within the pipe nipple 620 through an interference fit or any other conventional means for doing so. The lower portion of the stratifier 630 extends below the pipe nipple 620 bottom end 620b. The bottom end 630b of the stratifier 630 is closed. When installed in the hot water return 450, the lower portion of the stratifier 630 extends into the tank 120, 320.

The lower portion of the stratifier 630 includes an array of holes or apertures 650 in its side wall. The perforation or hole pattern includes staggered or straight (i.e., aligned) rows of holes 650. The holes 650 direct the flow of water perpendicular to the longitudinal axis 640. The holes 650 are sized to allow any potential debris to pass through so the holes 650 do not become plugged. The holes 650 are also sized and arranged to ensure laminar flow leaving the holes 650. The holes 650 are also sized so that the combined surface area of the openings results in a Reynolds number less than 500. This results in laminar flow of hot water into the tank 120, 320 which minimizes turbulence or mixing within the tank 120, 320. The stratifier 630 spreads the hot water into the top of the tank 120, 320 and can therefore be described as a diffuser of hot water into the tank 120, 320. The holes 650 are located along a length of the lower portion of the stratifier 630 parallel to the longitudinal axis 640. In the illustrated embodiment, the length is between approximately 2 inches and approximately 3 inches (e.g., approximately 2.5 inches).

With minimum mixing, water is significantly stratified across a thin layer of water near the bottom of the storage tank 120, 320. Above this thin layer of water, temperature of water is uniform and very close to that of water leaving the heat engine 150; below this thin layer of water, temperature of water is also uniform but much lower than that of water leaving the heat engine 150. Thus the majority of the storage tank 120, 320 is charged with water at desired temperature and the efficiency of the heat engine 150 can be ensured by the low temperature of inlet water coming from lower portion of the storage tank 120, 320. The water stratifier 630 of the present invention will allow a high charging flow to shorten the charging duration. In addition, the new water stratifier 630 can be used with different sizes of storage tank 120, 320, and will maximize the hot water storage capacity for a relatively short tank 320.

FIGS. 11-19 illustrate variations on the stratifier assembly 610 illustrated in FIGS. 9-10. Each stratifier assembly uses the same pipe nipple 620 discussed above, which is a conventional component.

Figure 11:
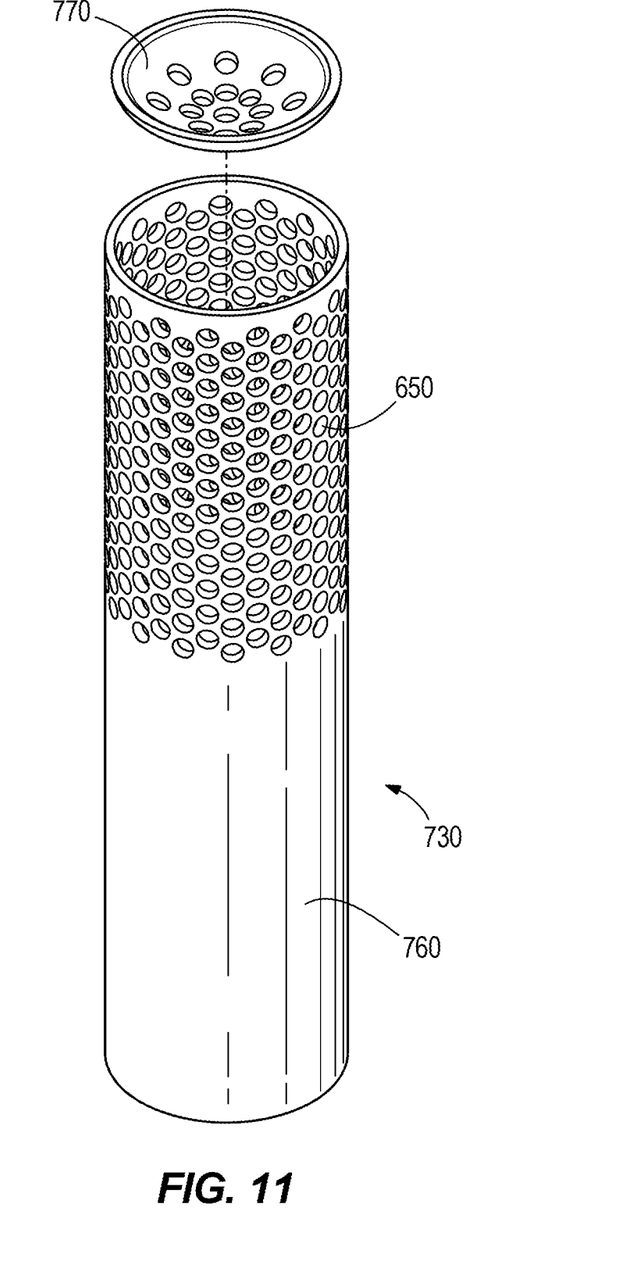
FIG. 11 is an exploded view of another construction of the stratifier.
Figure 12:
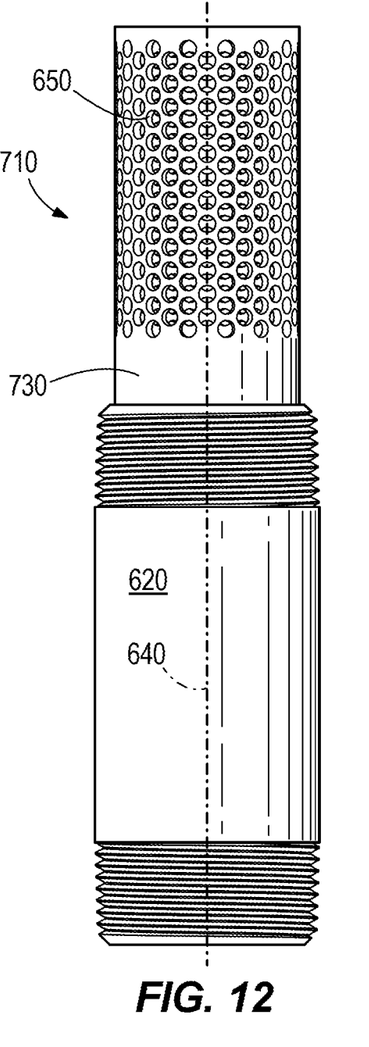
FIG. 12 is a side view of the stratifier assembly including the stratifier of FIG. 11.
Figure 13:
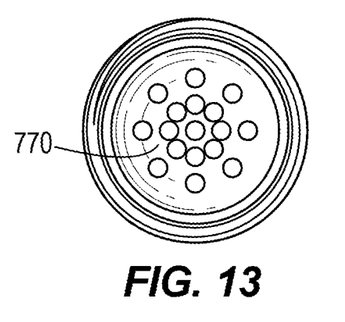
FIG. 13 is an end view of the construction of FIG. 12.

FIGS. 11-13 illustrate an alternative version of the stratifier assembly 710. FIG. 11 illustrates the stratifier 730, which is constructed of a plastic or metal pipe 760 with an end cap 770 welded into one end of the pipe 760. The holes 650 are structured and arranged much like in FIGS. 9-10. The pipe 760 and end cap 770 are made of the same material (e.g., plastic or metal) having the same thickness to facilitate welding. The pattern in the end cap 770 is concentric rings of holes 650 or may be the same as the pattern of holes in the pipe 760. FIGS. 12-13 illustrate the stratifier assembly 710 with the stratifier 730 received in the pipe nipple 620.

Figure 14:
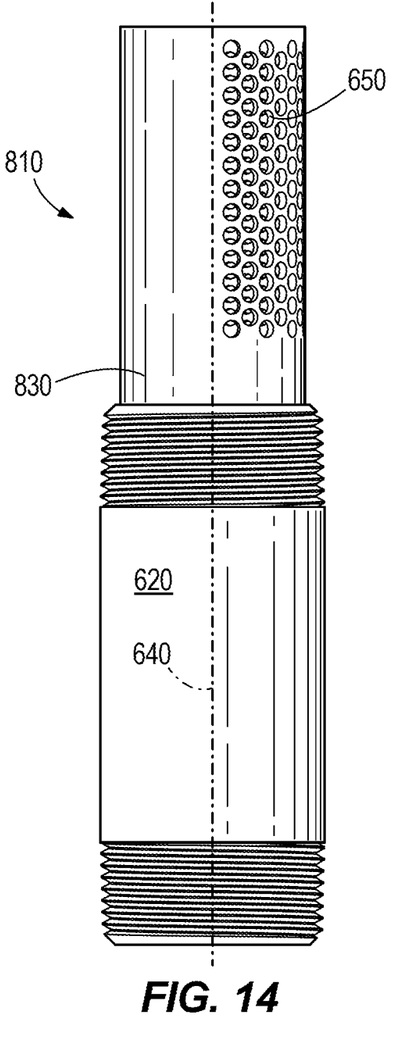
FIG. 14 is a side view of another construction of the stratifier assembly.
Figure 15:
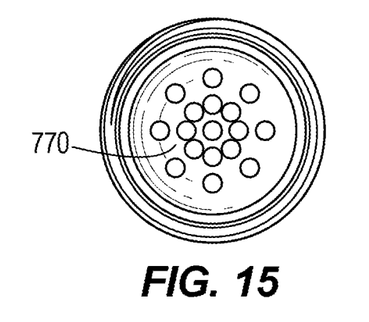
FIG. 15 is an end view of the construction of FIG. 14.
Figure 16:
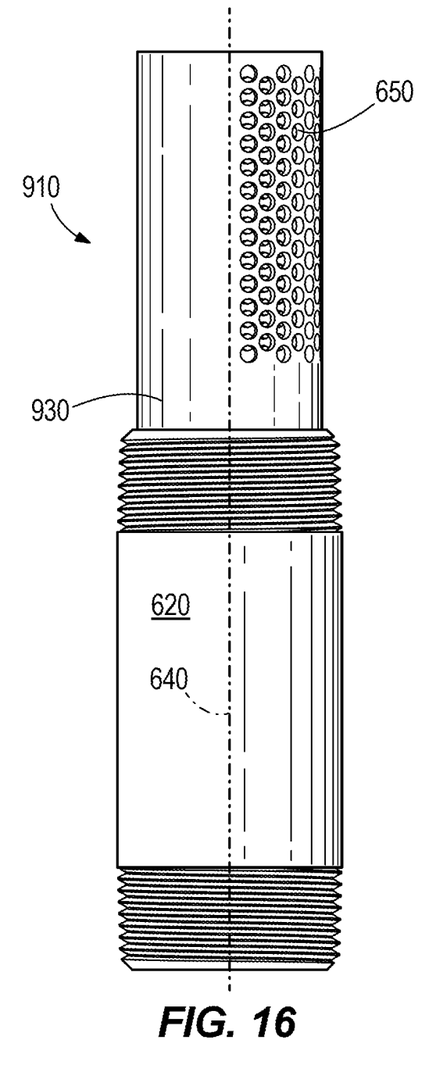
FIG. 16 is a side view of another construction of the stratifier assembly.
Figure 17:
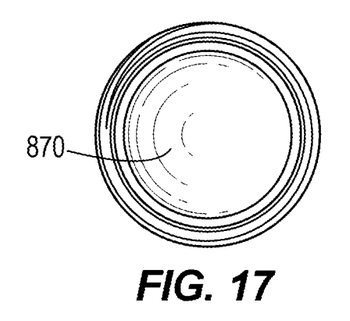
FIG. 17 is an end view of the construction of FIG. 16.

FIG. 14 is a side view of an alternative stratifier assembly 810 with holes 650 only on half of the stratifier 830 lower portion. The end view of FIG. 15 illustrates that the assembly 810 uses the same end cap 770 as in the previously-described assembly 710. FIGS. 16-17 illustrate another version of the stratifier assembly 910, similar to FIGS. 14-15 but with a solid or unperforated end cap 870 having no holes. The stratifier assemblies 810, 910 of FIGS. 14-17 may be used for a horizontally-oriented stratifier assembly (i.e., introduced through a side of the tank) with the holes discharging hot water upward in the top of the tank 120, 320 to discourage mixing with water below the stratifier assembly 710, 810.

Figure 18:
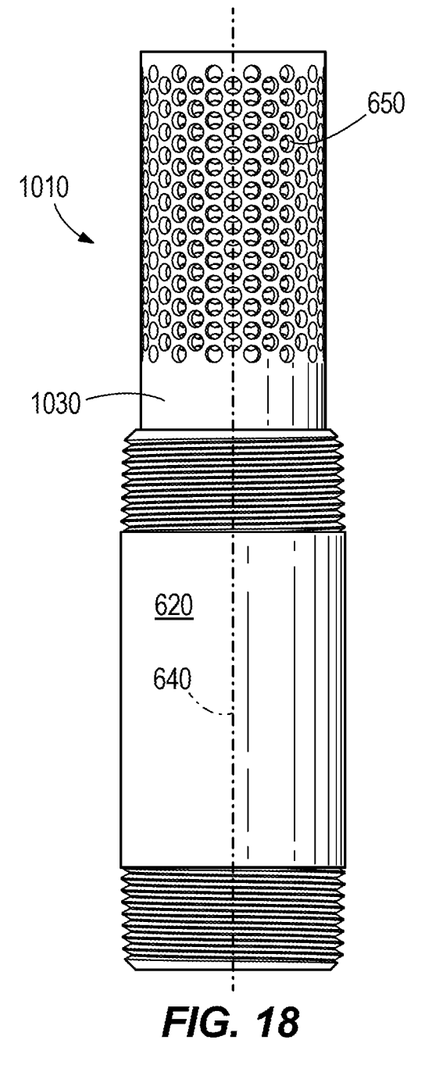
FIG. 18 is a side view of another construction of the stratifier assembly.
Figure 19:
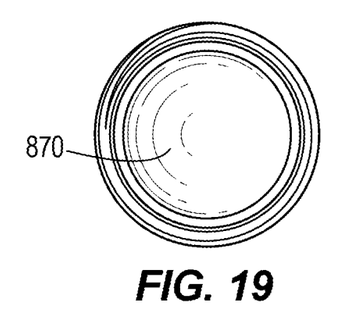
FIG. 19 is an end view of the construction of FIG. 18.

FIGS. 18-19 illustrate a stratifier assembly 1010 similar to that of FIGS. 11-13, but the stratifier 1030 includes a solid end cap 870 like in FIG. 17.

Thus, the invention provides, among other things, a water heater having a hot water storage tank and at least one external heat engine, utilizing a stratifier that returns hot water to the tank in a manner that minimizes mixing and maximizes hot water volume in the storage tank. Various features and advantages of the invention are set forth in the following claims.

What is claimed is:

1. A tank-type water heater comprising:
    a tank for storage of water, the tank including a top, a bottom, and a hot water return spud communicating with a top portion of the water tank;
    a heating circuit including a heat engine outside of the tank, a heating circuit outlet communicating between the bottom of the tank and the heat engine for delivery of water to be heated from the tank bottom to the heat engine, and a heating circuit return including the hot water return spud and communicating between the heat engine and tank for return of water heated by the heat engine to the tank through the hot water return spud;
    a stratifier located at least partially within the hot water return spud and introducing all of the heated water from the heating circuit return into the top portion of the tank in a diffuse manner to promote stratification of hot water in the tank above the heating circuit outlet; and
    a pipe nipple coupled to the hot water return spud, wherein a portion of the pipe nipple is positioned within the hot water return spud, and wherein a portion of the stratifier is at least partially received in the pipe nipple.

2. The water heater of claim 1, wherein the stratifier includes apertures that are sized and arranged so that the combined surface area of the apertures results in fluid flow through the stratifier that has a Reynolds number less than 500.

3. The water heater of claim 1, wherein the stratifier imparts laminar flow to the heated water being introduced to the top portion of the tank.

4. The water heater of claim 1, wherein the stratifier includes a plurality of holes for diffusion of the heated water into the top portion of the tank.

5. The water heater of claim 1, wherein the stratifier includes a longitudinal axis disposed vertically in the top portion of the tank.

6. The water heater of claim 5, wherein the stratifier includes a plurality of holes having axes perpendicular to the longitudinal axis, the holes causing laminar and diffuse flow of heated water into the top portion of the tank.

7. The water heater of claim 1, wherein the tank is cylindrical and includes a height and a diameter, the aspect ratio of tank height to diameter being less than 2.0.

8. The water heater of claim 1, wherein the tank is cylindrical and includes a height and a diameter, the aspect ratio of tank height to diameter being less than 1.5.

9. The water heater of claim 1, wherein the tank is cylindrical and includes a height and a diameter, the aspect ratio of tank height to diameter being less than 1.2.

10. A method of maximizing hot water stored in a water heater tank, the method comprising the steps of:
    (a) providing a tank having a top portion, a bottom portion, a heating circuit return including a hot water return spud joined to the top portion of the tank, the hot water return spud communicating through a wall of the tank with an interior volume of the tank, and a stratifier directly mounted to the hot water return spud and extending from the hot water return spud into the interior volume of the tank in the top portion of the tank;
    (b) filling the interior volume of the tank with water;
    (c) drawing water from the bottom portion of the tank;
    (d) heating the water drawn from the tank in an external heat engine; and
    (e) returning all of the heated water from the external heat engine to the top portion of the tank via the heating circuit return and the stratifier in a manner that minimizes turbulence in the water in the tank.

11. The method of claim 10, wherein step (a) includes providing a cylindrical tank having a height-to-diameter ratio of less than 2.0.

12. The method of claim 10, wherein step (a) includes providing a cylindrical tank having a height-to-diameter ratio of less than 1.5.

13. The method of claim 10, wherein step (a) includes providing a cylindrical tank having a height-to-diameter ratio of less than 1.2.

14. The method of claim 10, wherein step (e) includes introducing the heated water into the top portion of the tank using the stratifier having apertures that are sized and arranged so that the combined surface area of the apertures results in fluid flow at a Reynolds number below 500.

15. The method of claim 10, wherein step (e) includes introducing the heated water into the top portion of the tank as a laminar flow.

16. The method of claim 10, wherein step (e) includes passing the heater water through the stratifier to introduce the heated water into the top portion of the tank in a diffuse fashion to minimize mixing with water in the tank.

17. The method of claim 16, wherein the vertical stratifier includes a plurality of holes having horizontal axes such that heated water is introduced into the top portion of the tank in horizontally through the holes.

18. The method of claim 16, wherein step (e) includes introducing the water into the top portion of the tank at a Reynolds number below 500.

19. The method of claim 10, wherein the stratifier is a vertical stratifier, wherein step (e) includes positioning the vertical stratifier in the top portion of the tank, flowing the heated water through the stratifier, and introducing the water into the top portion of the tank with the stratifier in a diffuse, laminar fashion.

* * * * *